US012001159B2

(12) United States Patent
Watanabe et al.

(10) Patent No.: US 12,001,159 B2
(45) Date of Patent: Jun. 4, 2024

(54) ADJUSTMENT METHOD FOR IMAGE FORMING APPARATUS, AND IMAGE FORMING APPARATUS

(71) Applicant: KYOCERA Document Solutions Inc., Osaka (JP)

(72) Inventors: Masaru Watanabe, Osaka (JP); Kanako Kikuchi, Osaka (JP); Yasuaki Sakamoto, Osaka (JP); Ayato Morikami, Osaka (JP); Yuki Nakaiwa, Osaka (JP); Keisuke Oba, Osaka (JP); Koji Uno, Osaka (JP); Takuji Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/147,174

(22) Filed: Dec. 28, 2022

(65) Prior Publication Data

US 2023/0213880 A1 Jul. 6, 2023

(30) Foreign Application Priority Data

Jan. 6, 2022 (JP) ................................. 2022-000910

(51) Int. Cl.
*G03G 15/00* (2006.01)
*G03G 15/01* (2006.01)

(52) U.S. Cl.
CPC ..... *G03G 15/5041* (2013.01); *G03G 15/0131* (2013.01); *G03G 15/5058* (2013.01); *G03G 2215/00059* (2013.01)

(58) Field of Classification Search
CPC .... G03G 15/0848–0855; G03G 15/1675–168; G03G 15/5054–5058; G03G 15/0131
See application file for complete search history.

(56) References Cited

U.S. PATENT DOCUMENTS 6,097,921 A * 8/2000 Kageyama ........... G03G 15/231 399/306
8,249,474 B2 * 8/2012 Wada ................. G03G 15/5041 399/49

(Continued)

FOREIGN PATENT DOCUMENTS

JP 2003140410 A * 5/2003
JP 2003207958 A * 7/2003
JP 2012093488 A 5/2012

*Primary Examiner* — Sevan A Aydin
(74) *Attorney, Agent, or Firm* — Alleman Hall & Tuttle LLP

(57) ABSTRACT

A processor causes a printing portion to execute, when first conveying processing is executed, test print processing for executing processing of forming a plurality of test toner images on a sheet under a print condition that differs for each of the plurality of test toner images. The processor acquires a plurality of first sensing densities when the first conveying processing is executed. The processor causes the printing portion to execute the test print processing when second conveying processing is executed. The processor acquires a plurality of second sensing densities when the second conveying processing is executed. The processor compares the plurality of first sensing densities and the plurality of second sensing densities to adjust the print condition in the print processing when the second conveying processing is executed.

4 Claims, 5 Drawing Sheets

(56) References Cited

U.S. PATENT DOCUMENTS

| | | | | |
|---|---|---|---|---|
| 2005/0281572 | A1* | 12/2005 | Kawakami | G03G 15/556 399/49 |
| 2009/0190949 | A1* | 7/2009 | Hamahashi | G03G 15/232 399/101 |
| 2011/0188871 | A1* | 8/2011 | Fujita | G03G 15/0189 399/49 |
| 2012/0328314 | A1* | 12/2012 | Sugimoto | G03G 15/234 399/66 |
| 2019/0286034 | A1* | 9/2019 | Kitada | G03G 15/0855 |
| 2023/0305468 | A1* | 9/2023 | Wakasa | G03G 21/0058 |

* cited by examiner

ADJUSTMENT METHOD FOR IMAGE FORMING APPARATUS, AND IMAGE FORMING APPARATUS

INCORPORATION BY REFERENCE

This application is based upon and claims the benefit of priority from the corresponding Japanese Patent Application No. 2022-000910 filed on Jan. 6, 2022, the entire contents of which are incorporated herein by reference.

BACKGROUND

The present disclosure relates to an adjustment method for an image forming apparatus capable of performing double-sided printing, and an image forming apparatus.

An image forming apparatus that uses electrophotography forms a toner image on a surface of an image-carrying member and conveys a sheet. In addition, the image forming apparatus transfers the toner image formed on the surface of the image-carrying member onto the sheet at a transfer position.

In a case where the image forming apparatus is a tandem-type color image forming apparatus, the image-carrying member includes a photoconductor and an intermediate transfer belt. In this case, formation of an electrostatic latent image and development from the electrostatic latent image into the toner image are carried out on the surface of the photoconductor.

Further, the toner image formed on the surface of the photoconductor is transferred onto a surface of the intermediate transfer belt. Furthermore, the toner image formed on the surface of the intermediate transfer belt is transferred onto the sheet.

Moreover, the image forming apparatus may include a density sensing portion that senses a toner density on the surface of the intermediate transfer belt. For example, the density sensing portion senses a toner density of a portion on the surface of the intermediate transfer belt, that has passed through the transfer position.

For example, it is known that, when a patch image is formed on the surface of the intermediate transfer belt and the patch image is transferred onto the sheet, a gradation correction lookup table is corrected based on a sensing result of the density sensing portion.

SUMMARY

An adjustment method for an image forming apparatus according to an aspect of the present disclosure is a method of adjusting an image forming apparatus including a conveying portion, a printing portion, and a density sensing portion. The conveying portion is capable of executing first conveying processing for conveying a sheet such that a first surface of the sheet faces a target direction at a transfer position on a conveying path, and subsequently executing second conveying processing for conveying the sheet such that a second surface of the sheet faces the target direction at the transfer position. The printing portion executes print processing for forming a toner image on a surface of a rotating image-carrying member, and transferring the toner image onto the first surface or the second surface of the sheet which is facing the target direction from the image-carrying member, at the transfer position. The density sensing portion senses a toner density of a portion on the surface of the image-carrying member, which has passed through the transfer position. The adjustment method includes causing, by a processor, the printing portion to execute, when the first conveying processing is executed, test print processing for executing processing of forming on the sheet a plurality of test toner images having intervals provided therebetween along a conveying direction of the sheet, under a print condition that differs for each of the plurality of test toner images. The adjustment method further includes acquiring, by the processor, when the first conveying processing is executed, a plurality of first sensing densities that are sensing densities sensed by the density sensing portion for a plurality of test areas that are areas on the surface of the image-carrying member where the plurality of test toner images have been formed. The adjustment method further includes causing, by the processor, the printing portion to execute the test print processing when the second conveying processing is executed. The adjustment method further includes acquiring, by the processor, when the second conveying processing is executed, a plurality of second sensing densities that are sensing densities sensed by the density sensing portion for the plurality of test areas on the surface of the image-carrying member. The adjustment method further includes comparing, by the processor, the plurality of first sensing densities and the plurality of second sensing densities to adjust the print condition in the print processing when the second conveying processing is executed.

An image forming apparatus according to another aspect of the present disclosure includes the conveying portion, the printing portion, the density sensing portion, and a processor that realizes the adjustment method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the attached drawings. It is noted that the following embodiments are embodied examples of the present disclosure and do not limit the technical scope of the present disclosure.

First Embodiment

An image forming apparatus 10 according to a first embodiment is an apparatus that executes print processing using electrophotography. The print processing is processing of forming an image on a sheet 9. The sheet 9 is an image forming medium such as a printing sheet and a sheet-type resin member.

[Configuration of Image Forming Apparatus 10]

Figure 1:
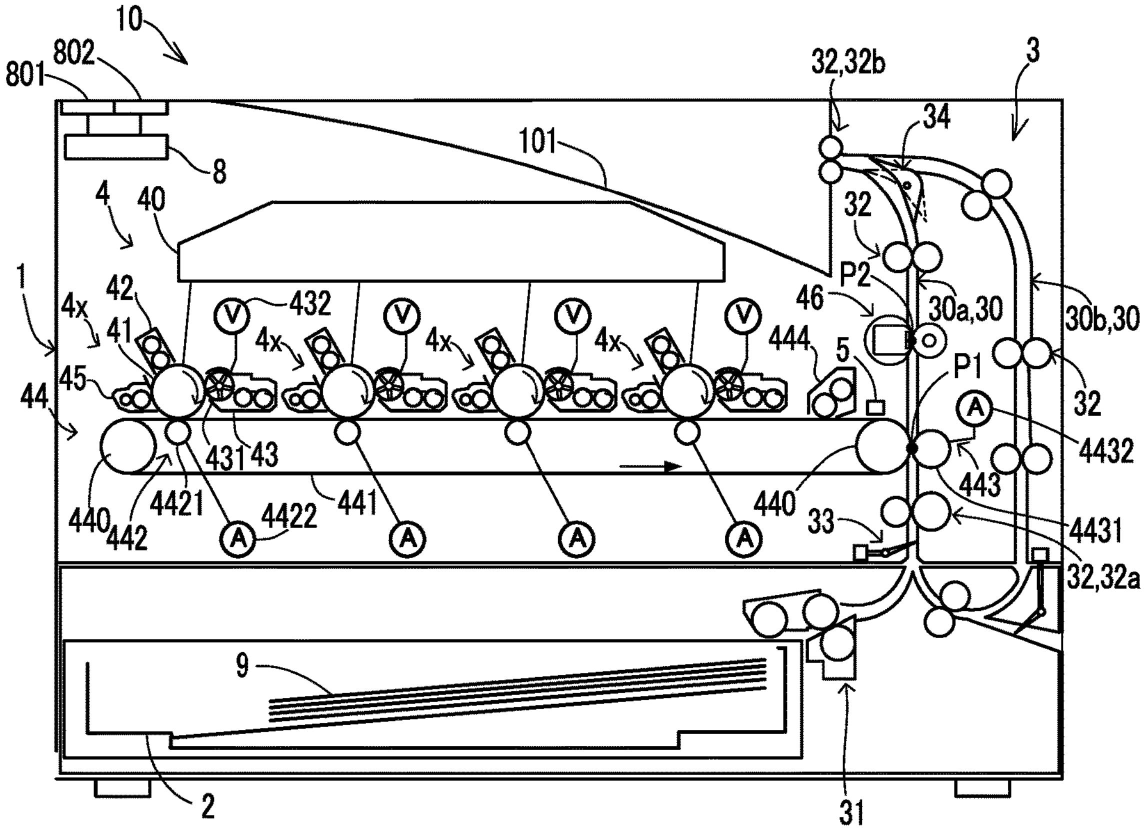
FIG. 1 is a configuration diagram of an image forming apparatus according to a first embodiment.

As shown in FIG. 1, the image forming apparatus 10 includes a sheet storing portion 2, a sheet conveying path 30, a sheet conveying device 3, and a printing device 4. The image forming apparatus 10 also includes an operation device 801, a display device 802, and a control device 8.

The sheet conveying path 30, the sheet conveying device 3, the printing device 4, and the control device 8 are accommodated in a housing 1.

The sheet storing portion 2 stores sheets 9. The sheet conveying device 3 takes out a sheet 9 from the sheet storing portion 2 and feeds the sheet 9 to the sheet conveying path 30, and further conveys the sheet 9 along the sheet conveying path 30. The sheet conveying device 3 is an example of a conveying portion.

The sheet conveying path 30 includes a main conveying path 30*a* and a sub conveying path 30*b*. The main conveying path 30*a* is a path that starts from an entrance opposing the sheet storing portion 2 and reaches a discharge port via a transfer position P1 and a fixing position P2.

The sub conveying path 30*b* branches from the main conveying path 30*a* at a portion on a downstream side of the fixing position P2 in a sheet conveying direction, and is provided in parallel with the main conveying path 30*a*. In addition, the sub conveying path 30*b* joins the main conveying path 30*a* at a portion on an upstream side of the transfer position P1 in the sheet conveying direction.

The sheet conveying device 3 includes a sheet feed mechanism 31, a plurality of conveying roller pairs 32, a sheet sensing device 33, and a movable guide mechanism 34. The plurality of conveying roller pairs 32 include a pair of registration rollers 32*a* and a pair of discharge rollers 32*b*.

The sheet feed mechanism 31 feeds the sheet 9 in the sheet storing portion 2 to the main conveying path 30*a*. The plurality of conveying roller pairs 32 convey the sheet 9 along the main conveying path 30*a* or the sub conveying path 30*b*.

After temporarily stopping the sheet 9 on the main conveying path 30*a*, the pair of registration rollers 32*a* feed the sheet 9 to the transfer position P1 on the main conveying path 30*a*.

By rotating in a first direction, the pair of discharge rollers 32*b* convey the sheet 9 in a forward direction. By rotating in the first direction, the pair of discharge rollers 32*b* discharge the sheet 9 on a discharge tray 101 from the main conveying path 30*a*.

On the other hand, by rotating in a second direction, the pair of discharge rollers 32*b* convey the sheet 9 in a backward direction. By rotating in the second direction, the pair of discharge rollers 32*b* convey the sheet 9 from the main conveying path 30*a* to the sub conveying path 30*b*. Thus, the sheet 9 inverted to be upside down and turned backwards is conveyed to the sub conveying path 30*b*.

The movable guide mechanism 34 is capable of being switched between a first state and a second state. The movable guide mechanism 34 is held at the first state when the pair of discharge rollers 32*b* rotate in the first direction. On the other hand, the movable guide mechanism 34 is held at the second state when the pair of discharge rollers 32*b* rotate in the second direction.

In the first state, the movable guide mechanism 34 guides the sheet 9 conveyed in the forward direction along the main conveying path 30*a* to the pair of discharge rollers 32*b*. On the other hand, in the second state, the movable guide mechanism 34 guides the sheet 9 conveyed in the backward direction by the pair of discharge rollers 32*b* to the sub conveying path 30*b*.

The plurality of conveying roller pairs 32 arranged on the sub conveying path 30*b* convey the sheet 9 along the sub conveying path 30*b*. In addition, the plurality of conveying roller pairs 32 convey the sheet 9 from the sub conveying path 30*b* to the pair of registration rollers 32*a* on the main conveying path 30*a*. Thus, the pair of registration rollers 32*a* convey the sheet 9 that has been inverted to be upside down and turned backwards to the transfer position P1.

The sheet sensing device 33 senses the sheet 9 at a sensing position on the main conveying path 30*a*. The sensing position is a position on the upstream side of the pair of registration rollers 32*a* in the sheet conveying direction. The sensing result of the sheet sensing device 33 is used for control to stop the pair of registration rollers 32*a*.

For example, the sheet sensing device 33 includes a swinging member and an object sensing sensor. The swinging member is supported in a swingable manner. The swinging member swings by being brought into contact with the sheet 9 that passes through the sensing position.

The object sensing sensor senses a swing that is caused by the swinging member coming into contact with the sheet 9. For example, the object sensing sensor is a photosensor that senses a part of the swinging member at a predetermined position, or the like.

The printing device 4 executes the print processing on the sheet 9 conveyed along the main conveying path 30*a*. In this embodiment, the printing device 4 is a tandem-type color printing device.

The printing device 4 forms a toner image on the sheet 9 conveyed along the main conveying path 30*a*. The toner image is an image that uses toner as developer. The toner is an example of granulated developer. The printing device 4 is an example of a printing portion.

The printing device 4 includes a plurality of image forming portions 4*x*, a laser scanning unit 40, a transfer device 44, and a fixing device 46. In this embodiment, the printing device 4 includes four image forming portions 4*x* corresponding to four colors of yellow, cyan, magenta, and black.

Each of the image forming portions 4*x* includes a drum-type photoconductor 41, a charging device 42, a developing device 43, a drum cleaning device 45, and the like.

In each of the image forming portions 4*x*, the photoconductor 41 rotates so that a surface of the photoconductor 41 is charged by the charging device 42. Further, the laser scanning unit 40 scans laser light so as to form an electrostatic latent image on the surface of the rotating photoconductor 41.

In addition, the developing device 43 supplies the toner to the surface of the photoconductor 41 to thus develop the electrostatic latent image into the toner image.

The developing device 43 includes a developing roller 431 and a bias output device 432. The developing roller 431 is disposed so as to oppose the photoconductor 41. The bias output device 432 supplies a developing bias voltage to the developing roller 431.

The developing roller 431 rotates while carrying toner, and causes the carried toner to come into contact with the surface of the photoconductor 41. The toner carried by the developing roller 431 is transferred to a portion of the electrostatic latent image on the surface of the photoconductor 41 by an electric field generated between the developing roller 431 and the photoconductor 41. Thus, the electrostatic latent image is developed into the toner image.

The transfer device 44 includes an intermediate transfer belt 441, four primary transfer devices 442 respectively corresponding to the four image forming portions 4*x*, a secondary transfer device 443, and a belt cleaning device 444.

The intermediate transfer belt 441 is supported by a plurality of supporting rollers 440. One of the plurality of supporting rollers 440 rotates by power from a motor (not shown). Thus, the intermediate transfer belt 441 rotates.

In the transfer device 44, each of the primary transfer devices 442 transfers the toner image formed on the surface of the photoconductor 41 onto a surface of the intermediate transfer belt 441. Thus, the toner images in a plurality of colors are formed on the surface of the intermediate transfer belt 441.

Each of the primary transfer devices 442 includes a primary transfer member 4421 and a primary current output device 4422. The primary transfer member 4421 is disposed so as to oppose the photoconductor 41 via the intermediate transfer belt 441.

The primary current output device 4422 supplies a primary transfer current to the primary transfer member 4421. The toner image formed on the surface of the photoconductor 41 is transferred onto the surface of the intermediate transfer belt 441 by an electric field generated between the photoconductor 41 and the primary transfer member 4421.

As described above, the four image forming portions 4*x* form the toner images to be transferred onto the surface of the intermediate transfer belt 441 on the surfaces of the four photoconductors 41. In other words, the four image forming portions 4*x* form the toner images on the surface of the intermediate transfer belt 441 via the four photoconductors 41.

The secondary transfer device 443 transfers the toner images formed on the intermediate transfer belt 441 onto the sheet 9 at the transfer position P1 on the main conveying path 30*a*. The secondary transfer device 443 is an example of a transfer portion that transfers the toner images onto the sheet 9 from an image-carrying member.

The secondary transfer device 443 includes a secondary transfer member 4431 and a secondary current output device 4432. The secondary transfer member 4431 is in contact with the intermediate transfer belt 441 at the transfer position P1. At the transfer position P1, the sheet 9 is passed through between the intermediate transfer belt 441 and the secondary transfer member 4431.

The secondary current output device 4432 supplies a secondary transfer current to the secondary transfer member 4431. The toner images formed on the surface of the intermediate transfer belt 441 are transferred onto the sheet 9 by an electric field generated between the intermediate transfer belt 441 and the secondary transfer member 4431.

As described above, the transfer device 44 transfers the toner images formed on the surfaces of the photoconductors 41 onto the sheet 9 via the intermediate transfer belt 441.

In this embodiment, the four photoconductors 41 and the intermediate transfer belt 441 are each an example of the image-carrying member.

The printing device 4 carries out the formation of the electrostatic latent image and the development from the electrostatic latent image into the toner image, on the surfaces of the four photoconductors 41.

In addition, the printing device 4 transfers the toner images formed on the surfaces of the four photoconductors 41 onto the surface of the intermediate transfer belt 441. Furthermore, the printing device 4 transfers the toner images formed on the surface of the intermediate transfer belt 441 onto the sheet 9 at the transfer position P1.

When executing double-sided print processing, the sheet conveying device 3 is capable of executing first conveying processing and subsequently executing second conveying processing. The double-sided print processing is processing of forming an image on a first surface of the sheet 9 and subsequently forming an image on a second surface of the sheet 9.

The first conveying processing is processing of conveying the sheet 9 along the main conveying path 30*a* without passing through the sub conveying path 30*b*. The second conveying processing is processing of conveying the sheet 9 along the main conveying path 30*a* after passing through the sub conveying path 30*b*.

In the first conveying processing, the sheet conveying device 3 conveys the sheet 9 such that the first surface of the sheet 9 faces a target direction at the transfer position P1 on the main conveying path 30*a*. The target direction is a direction opposing the intermediate transfer belt 441 using the transfer position P1 as a reference.

On the other hand, in the second conveying processing, the sheet conveying device 3 conveys the sheet 9 such that the second surface of the sheet 9 faces the target direction at the transfer position P1 on the main conveying path 30*a*.

At the transfer position P1, the secondary transfer device 443 transfers the toner images onto the surface of the sheet 9 facing the target direction, from the intermediate transfer belt 441.

The first surface of the sheet 9 is a surface of the sheet 9 facing the target direction when the first conveying processing is executed. On the other hand, the second surface of the sheet 9 is a surface of the sheet 9 facing the target direction when the second conveying processing is executed.

The drum cleaning device 45 removes waste toner remaining on the surface of the photoconductor 41. The belt cleaning device 444 removes the waste toner remaining on the intermediate transfer belt 441. The waste toner is generated along with the formation of the toner images in the printing device 4.

The fixing device 46 heats and pressurizes the toner images on the sheet 9 at the fixing position P2 on the main conveying path 30*a*. Thus, the fixing device 46 fixes the toner images onto the sheet 9.

The operation device 801 is a device that accepts user operations. For example, the operation device 801 includes operation buttons and a touch panel.

The display device 802 is a device that displays information. For example, the display device 802 includes a panel display device such as a liquid crystal display unit.

[Configuration of Control Device 8]

Figure 2:
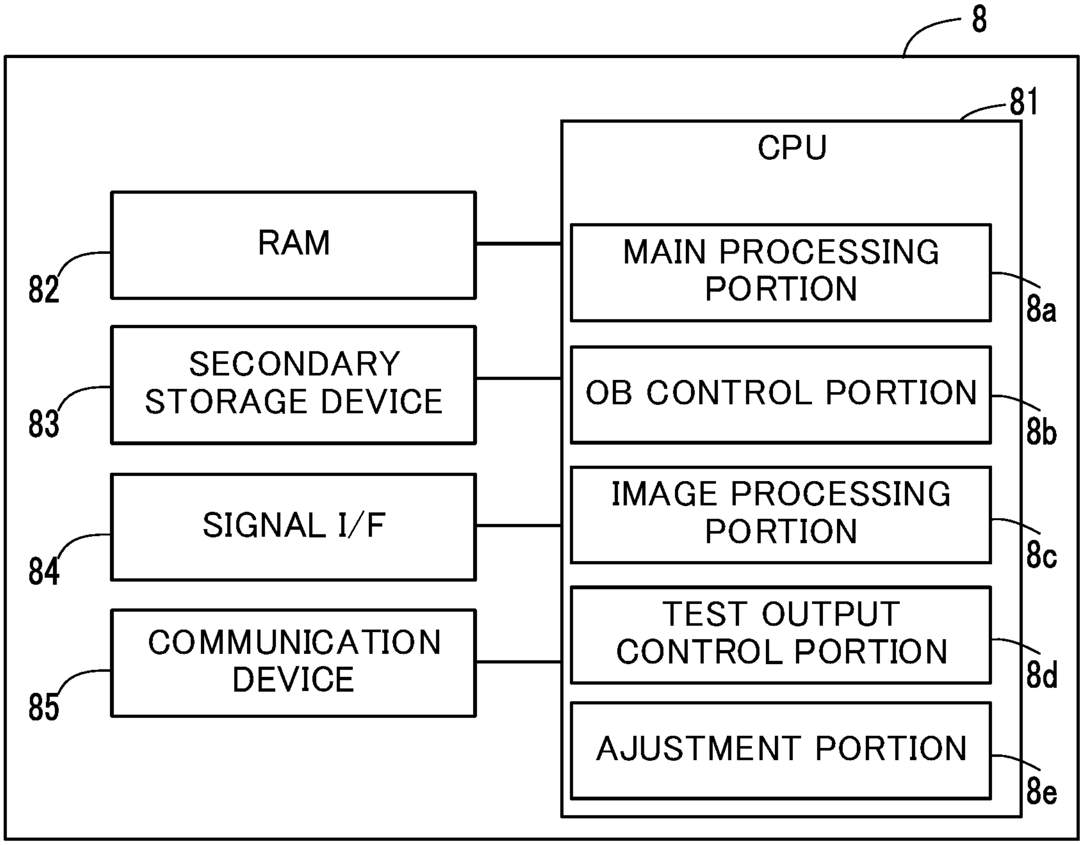
FIG. 2 is a block diagram showing a configuration of a control device in the image forming apparatus according to the first embodiment.

As shown in FIG. 2, the control device 8 includes a CPU (Central Processing Unit) 81, a RAM (Random Access Memory) 82, a secondary storage device 83, a signal interface 84, a communication device 85, and the like.

The secondary storage device 83 is a nonvolatile computer-readable storage device. The secondary storage device 83 is capable of storing and updating computer programs and various types of data. For example, one of or both of a flash memory and a hard disk drive is/are adopted as the secondary storage device 83.

The signal interface 84 converts signals output from various sensors into digital data, and transmits the digital data obtained by the conversion to the CPU 81. In addition, the signal interface 84 converts a control command output by the CPU 81 into a control signal, and transmits the control signal to a control target apparatus.

The communication device 85 communicates with other devices such as a host device (not shown). The CPU 81 communicates with the other devices via the communication device 85.

The CPU 81 is a processor that executes various types of data processing and control by executing the computer programs. The control device 8 including the CPU 81 controls the sheet conveying device 3, the printing device 4, the display device 802, the communication device 85, and the like.

The RAM 82 is a volatile computer-readable storage device. The RAM 82 temporarily stores the computer programs to be executed by the CPU 81 and data to be output or referenced by the CPU 81 in a process of executing various types of processing.

The CPU 81 includes a plurality of processing modules that are realized by executing the computer programs. The plurality of processing modules include a main processing portion 8*a*, a job control portion 8*b*, an image processing portion 8*c*, and the like.

The main processing portion 8*a* executes processing of causing various types of processing to be started in response to operations made with respect to the operation device 801, control of the display device 802, and the like.

The job control portion 8*b* controls the sheet conveying device 3. Thus, the job control portion 8*b* controls the feed of the sheet 9 from the sheet storing portion 2 and the conveyance of the sheet 9 on the sheet conveying path 30.

For example, the job control portion 8*b* causes the pair of registration rollers 32*a* to stop when a predetermined time has elapsed since the sheet 9 has been sensed by the sheet sensing device 33. Thus, the sheet 9 stops while a tip end portion thereof is nipped by the pair of registration rollers 32*a*.

In addition, the job control portion 8*b* causes the pair of registration rollers 32*a* to rotate in synchronization with a timing of forming the electrostatic latent image by the laser scanning unit 40.

Further, the job control portion 8*b* controls the printing device 4. The job control portion 8*b* causes the printing device 4 to execute the print processing in synchronization with the conveyance of the sheet 9 by the sheet conveying device 3.

The image processing portion 8*c* generates print data based on print target image data. The print data expresses values of a plurality of pixels in the electrostatic latent image. For example, the image processing portion 8*c* derives the print data using a gamma correction parameter. The gamma correction parameter indicates characteristics of output values with respect to input values of the print target image data.

The job control portion 8*b* causes the laser scanning unit 40 to execute processing of exposing the surfaces of the photoconductors 41 according to the print data. Thus, the laser scanning unit 40 forms the electrostatic latent image on the surfaces of the photoconductors 41.

Incidentally, the image forming apparatus 10 may execute the double-sided print processing for forming the toner images on both surfaces of the sheet 9.

In the double-sided print processing, transfer performance in transferring the toner images onto the first surface of the sheet 9 and transfer performance in transferring the toner images onto the second surface of the sheet 9 may differ.

In the image forming apparatus 10, the plurality of processing modules in the CPU 81 further include a test output control portion 8*d* and an adjustment portion 8*e* (see FIG. 2).

Figure 3:
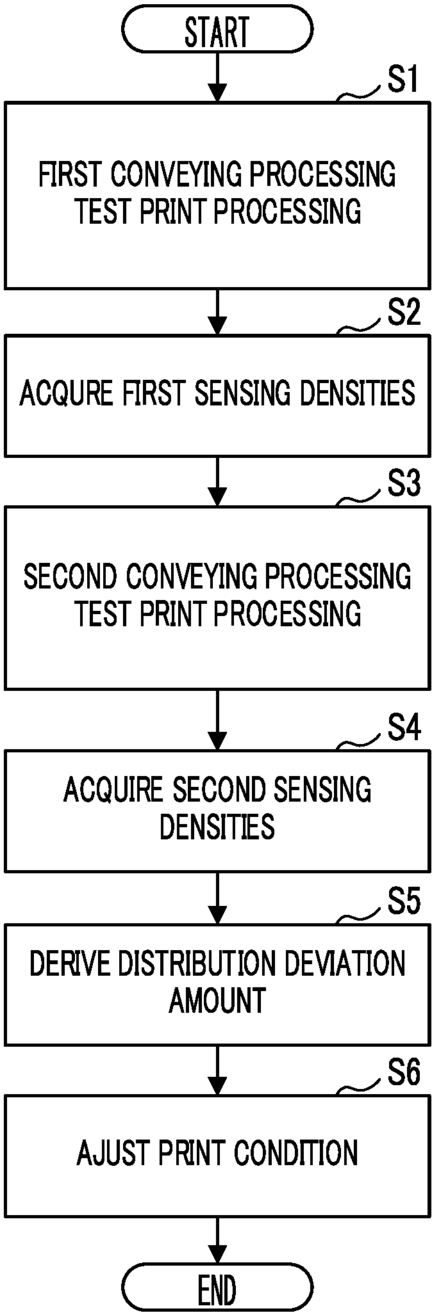
FIG. 3 is a flowchart showing exemplary procedures of print condition adjustment processing in the image forming apparatus according to the first embodiment.

The test output control portion 8*d* and the adjustment portion 8*e* execute print condition adjustment processing to be described later (see FIG. 3). Thus, the image forming apparatus 10 is capable of correcting a difference in the transfer performance in transferring the toner images in the first surface and the second surface of the sheet 9.

The image forming apparatus 10 further includes a density sensor 5 used in the print condition adjustment processing (see FIG. 1). The density sensor 5 senses a toner density of a portion on the surface of the intermediate transfer belt 441, that has passed through the transfer position P1.

The density sensor 5 senses a density of toner remaining on the surface of the intermediate transfer belt 441 after the toner images are transferred onto the sheet 9.

The density sensor 5 is, for example, CIS (Contact Image Sensor). The density sensor 5 is an example of a density sensing portion.

[Print Condition Adjustment Processing]

Hereinafter, exemplary procedures of the print condition adjustment processing will be described with reference to the flowchart shown in FIG. 3. The print condition adjustment processing is an example of processing for realizing the adjustment method for the image forming apparatus 10.

When the main processing portion 8*a* senses a predetermined adjustment start operation with respect to the operation device 801, the test output control portion 8*d* and the adjustment portion 8*e* execute the print condition adjustment processing.

In descriptions below, S1, S2, . . . represent identification symbols of a plurality of steps in the print condition adjustment processing. In the print condition adjustment processing, processing of Step S1 is executed first.

<Step S1>

In Step S1, the test output control portion 8*d* causes the sheet conveying device 3 to execute the first conveying processing. In addition, when the first conveying processing is being executed, the test output control portion 8*d* causes the printing device 4 to execute test print processing.

Figure 4:
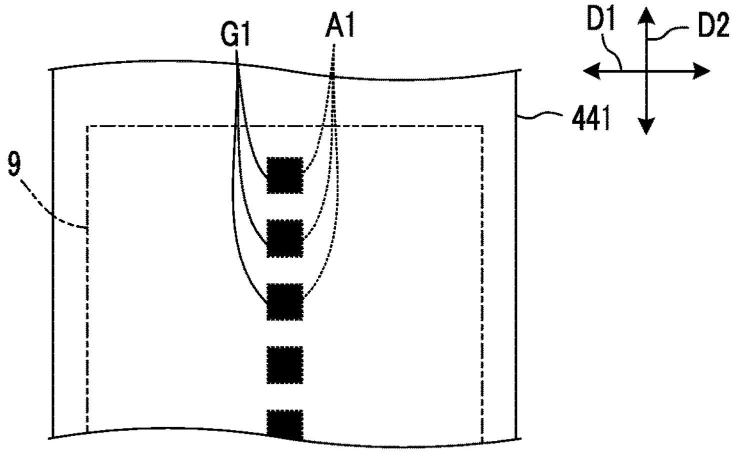
FIG. 4 is a diagram showing an example of test toner images that are output in the image forming apparatus according to the first embodiment.

The test print processing involves executing processing of forming on the sheet 9 a plurality of test toner images G1 having intervals provided therebetween in the conveying direction of the sheet 9, under a print condition that differs for each of the test toner images G1 (see FIG. 4).

Specifically, in Step S1, the test output control portion 8*d* causes the laser scanning unit 40 and at least one of the four image forming portions 4*x* to execute processing of forming the plurality of test toner images G1 having intervals provided therebetween in a rotation direction of the photoconductor 41 to be formed on the surface of the photoconductor 41.

Further, the test output control portion 8*d* causes the transfer device 44 to execute processing of transferring the plurality of test toner images G1 formed on the surface of the photoconductor 41 onto the sheet 9 via the intermediate transfer belt 441.

For example, the print condition that differs for each of the test toner images G1 is the secondary transfer current in the secondary transfer device 443. In this case, the test output control portion 8*d* controls the secondary current output device 4432 so that the secondary transfer current that differs for each of the test toner images G1 is output.

FIG. 4 shows the plurality of test toner images G1 transferred onto the intermediate transfer belt 441. In addition, in FIG. 4, the sheet 9 that is in contact with the intermediate transfer belt 441 at the transfer position P1 is indicated by a virtual line (chain double-dashed line).

In FIG. 4, a main scanning direction D1 and a sub scanning direction D2 are indicated by arrows. The main scanning direction D1 is a direction along a rotation shaft of the photoconductor 41. The main scanning direction D1 is also a width direction of the intermediate transfer belt 441.

The sub scanning direction D2 is a direction along the rotation direction of the photoconductor 41 on the surface of the photoconductor 41. The sub scanning direction D2 is also a direction along the rotation direction of the intermediate transfer belt 441 on the surface of the intermediate transfer belt 441.

By executing the processing of Step S1, the plurality of test toner images G1 are formed on the first surface of the sheet 9 under the different print conditions (see FIG. 4). The plurality of test toner images G1 are formed with intervals provided therebetween in the sub scanning direction D2.

For example, the test output control portion 8*d* causes the printing device 4 to execute the processing of forming the plurality of test toner images G1 in one representative image forming portion 4*x* out of the four image forming portions 4*x*. It is noted that the test output control portion 8*d* may alternatively cause the printing device 4 to execute the processing of forming the plurality of test toner images G1 in each of the four image forming portions 4*x*.

After executing the processing of Step S1, the test output control portion 8*d* shifts the processing to Step S2.

<Step S2>

In Step S2, the adjustment portion 8*e* acquires a plurality of first sensing densities from the density sensor 5. The plurality of first sensing densities are toner densities sensed by the density sensor 5 when the first conveying processing is executed.

The plurality of first sensing densities are sensing densities sensed by the density sensor 5 for a plurality of test areas A1 on the surface of the intermediate transfer belt 441 (see FIG. 4). The plurality of test areas A1 are areas on the surface of the intermediate transfer belt 441 where the plurality of test toner images G1 have been formed (see FIG. 4).

After executing the processing of Step S2, the adjustment portion 8*e* shifts the processing to Step S3.

<Step S3>

In Step S3, the test output control portion 8*d* causes the sheet conveying device 3 to execute the second conveying processing subsequent to the first conveying processing. In addition, when the second conveying processing is being executed, the test output control portion 8*d* causes the printing device 4 to execute the test print processing similar to Step S1.

By executing the processing of Step S3, the plurality of test toner images G1 are formed on the second surface of the sheet 9 under the different print conditions. The plurality of test toner images G1 are formed with intervals provided therebetween in the sub scanning direction D2.

After executing the processing of Step S3, the test output control portion 8*d* shifts the processing to Step S4.

<Step S4>

In Step S4, the adjustment portion 8*e* acquires a plurality of second sensing densities from the density sensor 5. The plurality of second sensing densities are toner densities sensed by the density sensor 5 when the second conveying processing is executed.

The plurality of second sensing densities are sensing densities sensed by the density sensor 5 for the plurality of test areas A1 on the surface of the intermediate transfer belt 441 (see FIG. 4). The plurality of test areas A1 are areas on the surface of the intermediate transfer belt 441 where the plurality of test toner images G1 have been formed (see FIG. 4).

After executing the processing of Step S4, the adjustment portion 8*e* shifts the processing to Step S5.

<Step S5>

In Step S5, the adjustment portion 8*e* compares the plurality of first sensing densities and the plurality of second sensing densities to derive a distribution deviation amount.

The distribution deviation amount is a deviation amount between the distribution of the plurality of first sensing densities and the distribution of the plurality of second sensing densities.

Figure 5:
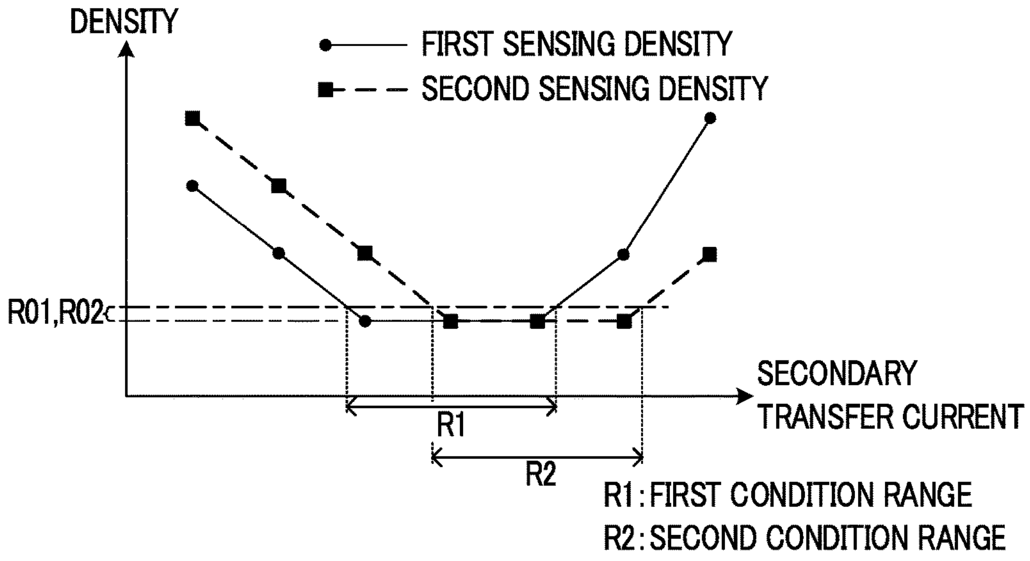
FIG. 5 is a diagram showing an example of distributions of sensing densities obtained by a density sensor in the print condition adjustment processing.

FIG. 5 shows an example of the distribution of the plurality of first sensing densities obtained in Step S2 and the distribution of the plurality of second sensing densities obtained in Step S4.

FIG. 5 shows an example of a case where, in the test print processing, the print condition that differs for each of the test toner images G1 is the secondary transfer current in the secondary transfer device 443.

In FIG. 5, a first condition range R1 is a range of the print condition corresponding to a low-density side peak area in the distribution of the plurality of first sensing densities.

Moreover, a second condition range R2 is a range of the print condition corresponding to a low-density side peak area in the distribution of the plurality of second sensing densities. It is noted that the low-density side peak area is an area that shows a so-called bottom peak.

In a case where the print condition that is changed for each of the test toner images G1 is the secondary transfer current, the first condition range R1 and the second condition range R2 are each a range of the secondary transfer current.

For example, the adjustment portion 8*e* sets a first peak density range R01 using a lowest density out of the plurality of first sensing densities as a reference. The first peak density range R01 is a density range of the low-density side peak area in the distribution of the plurality of first sensing densities.

Similarly, the adjustment portion 8*e* sets a second peak density range R02 using a lowest density out of the plurality of second sensing densities as a reference. The second peak density range R02 is a density range of the low-density side peak area in the distribution of the plurality of second sensing densities.

Specifically, the adjustment portion 8*e* sets a lowest density value out of the plurality of first sensing densities as a lower limit value of the first peak density range R01. Further, the adjustment portion 8*e* sets a value obtained by adding a constant to the lowest density value out of the plurality of first sensing densities as an upper limit value of the first peak density range R01.

Similarly, the adjustment portion 8*e* sets a lower limit value and upper limit value of the second peak density range R02 based on a lowest density value out of the plurality of second sensing densities.

Then, the adjustment portion 8*e* derives a range of the print condition corresponding to the first peak density range R01 in the distribution of the plurality of first sensing densities as the first condition range R1. Similarly, the adjustment portion 8*e* derives a range of the print condition corresponding to the second peak density range R02 in the distribution of the plurality of second sensing densities as the second condition range R2.

Furthermore, the adjustment portion 8*e* derives a deviation amount between the first condition range R1 and the second condition range R2 as the distribution deviation amount.

For example, the adjustment portion 8*e* derives a difference between a central value of the first condition range R1 and a central value of the second condition range R2 as the distribution deviation amount.

After executing the processing of Step S5, the adjustment portion 8*e* shifts the processing to Step S6.

<Step S6>

In Step S6, the adjustment portion 8*e* adjusts the print condition based on a result of the processing of Step S5.

In descriptions below, the print condition used when the first conveying processing is executed will be referred to as a first print condition. In addition, the print condition used when the second conveying processing is executed will be referred to as a second print condition.

For example, the adjustment portion 8*e* sets the central value of the first condition range R1 as a value of the first print condition. Further, the adjustment portion 8*e* may adjust the first print condition in a case where a difference between a preset value of the first print condition and the central value of the first condition range R1 exceeds a preset tolerance.

Furthermore, the adjustment portion 8*e* adjusts the second print condition according to the distribution deviation amount. For example, the adjustment portion 8*e* changes a value of the second print condition to a value obtained by adding the distribution deviation amount to the value of the first print condition.

The print condition adjusted in Step S6 is used when executing the double-sided print processing based on the print target image data.

As described above, the adjustment portion 8*e* compares the plurality of first sensing densities and the plurality of second sensing densities to adjust the print condition in the print processing when the second conveying processing is executed (Step S5 and Step S6).

In this embodiment, the adjustment portion 8*e* specifies the first condition range R1 and the second condition range R2 (Step S5). In addition, the adjustment portion 8*e* adjusts the second print condition based on a difference between the first condition range R1 and the second condition range R2 (Step S6).

By executing the print condition adjustment processing, a difference in the transfer performance in transferring the toner images in the first surface and second surface of the sheet 9 is corrected.

Second Embodiment

Next, an image forming apparatus 10A according to a second embodiment will be described with reference to FIG. 6.

Figure 6:
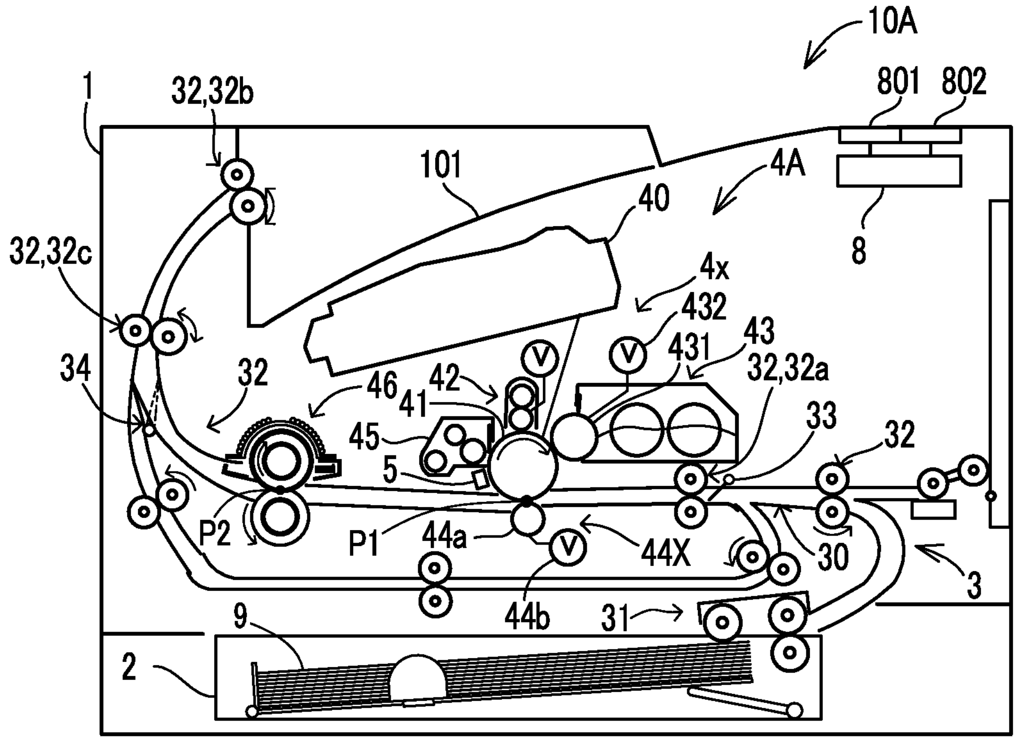
FIG. 6 is a configuration diagram of an image forming apparatus according to a second embodiment.

In FIG. 6, constituent elements that are the same as those shown in FIG. 1 are denoted by the same reference numerals. Hereinafter, points of the image forming apparatus 10A different from those of the image forming apparatus 10 will be described.

The image forming apparatus 10A includes a printing device 4A capable of forming only a monochrome image. The printing device 4A has a configuration in which the four image forming portions 4*x* and the transfer device 44 in the printing device 4 of the image forming apparatus 10 are replaced with one image forming portion 4*x* and a transfer device 44X. The one image forming portion 4*x* carries out the formation of the electrostatic latent image and the development from the electrostatic latent image into the toner image, on the surface of the photoconductor 41.

The transfer device 44X transfers the toner image formed on the surface of the photoconductor 41 onto the sheet 9 at the transfer position P1. In this embodiment, the photoconductor 41 is an example of the image-carrying member. In addition, the transfer device 44X is an example of the transfer portion that transfers the toner image onto the sheet 9 from the image-carrying member.

The sheet conveying device 3 of the image forming apparatus 10A is also capable of executing the first conveying processing and the second conveying processing.

In this embodiment, the plurality of conveying roller pairs 32 in the sheet conveying device 3 include a pair of draw-in rollers 32*c*. The pair of draw-in rollers 32*c* rotate in the first direction so as to convey the sheet 9 that has passed through the fixing position P2 to the pair of discharge rollers 32*b*.

Further, after the first conveying processing is executed, the pair of draw-in rollers 32*c* and the pair of discharge rollers 32*b* rotate in the second direction before the second conveying processing is executed.

By rotating in the second direction, the pair of draw-in rollers 32*c* and the pair of discharge rollers 32*b* convey the sheet 9 from the main conveying path 30*a* to the sub conveying path 30*b*. Thus, the sheet 9 that has been inverted to be upside down and turned backwards is conveyed to the sub conveying path 30*b*.

The test output control portion 8*d* and the adjustment portion 8*e* of the image forming apparatus 10A also execute the print condition adjustment processing when the adjustment start operation is sensed.

The transfer device 44X includes a transfer member 44*a* and a current output device 44*b*. The transfer member 44*a* is in contact with the photoconductor 41 at the transfer position P1. The sheet 9 is passed through between the photoconductor 41 and the transfer member 44*a* at the transfer position P1.

The current output device 44*b* supplies a transfer current to the transfer member 44*a*. The toner image formed on the surface of the photoconductor 41 is transferred onto the sheet 9 by an electric field generated between the photoconductor 41 and the transfer member 44*a*.

For example, the print condition that differs for each of the test toner images G1 is the transfer current in the transfer device 44X. In this case, the test output control portion 8*d* controls the current output device 44*b* so that the transfer current that differs for each of the test toner images G1 is output.

Also when adopting the image forming apparatus 10A, effects similar to those of the case where the image forming apparatus 10 is adopted are obtained.

Application Example

In the image forming apparatus 10, the print condition that differs for each of the test toner images G1 may be the primary transfer current in the developing device 43.

Moreover, in the image forming apparatus 10 and the image forming apparatus 10A, the print condition that differs for each of the test toner images G1 may be the developing bias voltage in the developing device 43. The developing device 43 is an example of a developing portion that develops an electrostatic latent image formed on the surface of the photoconductor 41 into the toner image.

Further, in the image forming apparatus 10 and the image forming apparatus 10A, the print condition that differs for each of the test toner images G1 may be an amount of emitted light in the laser scanning unit 40. The laser scanning unit 40 is an example of an exposure portion that forms the electrostatic latent image on the surface of the photoconductor 41.

Furthermore, in the image forming apparatus 10 and the image forming apparatus 10A, the print condition that differs for each of the test toner images G1 may be the gamma correction parameter used for deriving the print data by the image processing portion 8*c*.

As described above, the gamma correction parameter indicates characteristics of output values with respect to input values of the print target image data.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An adjustment method for an image forming apparatus including a conveying portion capable of executing first conveying processing for conveying a sheet such that a first surface of the sheet faces a target direction at a transfer position on a conveying path, and subsequently executing second conveying processing for conveying the sheet such that a second surface of the sheet faces the target direction at the transfer position, a printing portion which executes print processing for forming a toner image on a surface of a rotating image-carrying member, and transferring the toner image onto the first surface or the second surface of the sheet which is facing the target direction from the image-carrying member, at the transfer position, and a density sensing portion which senses a toner density of a portion on the surface of the image-carrying member, which has passed through the transfer position, the adjustment method comprising:

causing, by a processor, the printing portion to execute, when the first conveying processing is executed, test print processing for executing processing of forming on the sheet a plurality of test toner images having intervals provided therebetween along a conveying direction of the sheet, under a print condition that differs for each of the plurality of test toner images;

acquiring, by the processor, when the first conveying processing is executed, a plurality of first sensing densities that are sensing densities sensed by the density sensing portion for a plurality of test areas that are areas on the surface of the image-carrying member where the plurality of test toner images have been formed;

causing, by the processor, the printing portion to execute the test print processing when the second conveying processing is executed;

acquiring, by the processor, when the second conveying processing is executed, a plurality of second sensing densities that are sensing densities sensed by the density sensing portion for the plurality of test areas on the surface of the image-carrying member; and comparing, by the processor, the plurality of first sensing densities and the plurality of second sensing densities to adjust the print condition in the print processing when the second conveying processing is executed.

2. The adjustment method for an image forming apparatus according to claim 1, wherein the processor specifies a first condition range which is a range of the print condition corresponding to a low-density side peak area in a distribution of the plurality of first sensing densities and a second condition range which is a range of the print condition corresponding to a low-density side peak area in a distribution of the plurality of second sensing densities, and adjusts the print condition in the print processing when the second conveying processing is executed according to a deviation amount between the first condition range and the second condition range.

3. The adjustment method for an image forming apparatus according to claim 1, wherein the print condition is a transfer current in a transfer portion which transfers the toner image onto the sheet from the image-carrying member, a developing bias voltage in a developing portion which develops an electrostatic latent image formed on the surface of the image-carrying member into the toner image, an amount of emitted light in an exposure portion which forms the electrostatic latent image on the surface of the image-carrying member, or a gamma correction parameter indicating characteristics of output values with respect to input values of print target image data.

4. An image forming apparatus, comprising:

the processor which realizes the adjustment method for the image forming apparatus according to claim 1;

the conveying portion capable of executing first conveying processing for conveying the sheet such that the first surface of the sheet faces the target direction at the transfer position on the conveying path, and subsequently executing second conveying processing for conveying the sheet such that the second surface of the sheet faces the target direction at the transfer position;

the printing portion which executes print processing for forming the toner image on the surface of the rotating image-carrying member, and transferring the toner image onto the first surface or the second surface of the sheet which is facing the target direction from the image-carrying member, at the transfer position; and the density sensing portion which senses the toner density of the portion on the surface of the image-carrying member, which has passed through the transfer position.

* * * * *